US006948233B2

(12) United States Patent
Mukouda

(10) Patent No.: US 6,948,233 B2
(45) Date of Patent: Sep. 27, 2005

(54) DEVICE FOR MANUFACTURING METAL FERRULES USED FOR OPTICAL FIBERS

(76) Inventor: Takahiko Mukouda, 6-6, Minowa 1-chome, Taito-ku, Tokyo 110-0011 (JP)

( * ) Notice: Subject to any disclaimer, the term of this patent is extended or adjusted under 35 U.S.C. 154(b) by 0 days.

(21) Appl. No.: 10/610,542

(22) Filed: Jul. 2, 2003

(65) Prior Publication Data

US 2005/0177999 A1    Aug. 18, 2005

Related U.S. Application Data

(62) Division of application No. 09/895,388, filed on Jul. 2, 2001, now Pat. No. 6,754,953.

(51) Int. Cl.[7] .............................................. B23P 19/00
(52) U.S. Cl. ..................... 29/747; 29/33 M; 29/745; 29/874; 29/282
(58) Field of Search .............................. 29/33 D, 33 M, 29/33 T, 527.5, 527.6, 729, 744, 745, 749, 29/825, 826, 828, 862, 874, 886, 887, 282, 29/235, 280; 138/146; 174/78, 84 C, 86 R, 174/88 R, 84 R; 205/67, 73, 75, 78, 79; 385/15–79

(56) References Cited

U.S. PATENT DOCUMENTS 4,267,010 A  *  5/1981  Bates et al. ................... 117/26
4,479,910 A     10/1984 Kurokawa et al. ........... 264/2.5
5,194,129 A      3/1993 Kerkar et al. ................ 204/483
5,778,126 A      7/1998 Saitoh .......................... 385/84
5,862,280 A      1/1999 Tanaka et al. ................ 385/78
6,419,810 B1     7/2002 Tanaka et al. ................ 205/73
6,826,832 B2 *  12/2004 Takada et al. ................ 29/862

FOREIGN PATENT DOCUMENTS

| JP | 2001-91790 | * | 4/2001 | ............ G02B 6/36 |
| JP | 2001-192881 | * | 7/2001 | ............ G02B 6/36 |
| WO | WO00/31574 |   | 2/2000 |                       |

* cited by examiner

Primary Examiner—Peter Vo
Assistant Examiner—Donghai D. Nguyen
(74) Attorney, Agent, or Firm—Lowe Hauptman & Berner, LLP

(57) ABSTRACT

The present invention's device of manufacturing metal ferrules used as connector elements for optical fibers is characterized such that, by growth-guidance of an internal-diameter formation member whose external diameter is the same as the internal diameter of the metal ferrule to be manufactured, an electroformed layer having a cylindrical internal hole is grown on the cathode side of an electroforming cistern and said cylindrical electroformed layer is grown to a prescribed external diameter in the process of lifting such electroformed layer from the aforementioned electroforming cistern, and such that said cylindrical electroformed layer, when outside the aforementioned electroforming cistern, is cut to prescribed dimensions.

10 Claims, 8 Drawing Sheets

DEVICE FOR MANUFACTURING METAL FERRULES USED FOR OPTICAL FIBERS

This application is a divisional of application Ser. No. 09/895,388, filed Jul. 2, 2001, now U.S. Pat. No. 6,754,953.

BACKGROUND OF THE INVENTION

1. Field of the Invention

The present invention relates to manufacturing metal ferrules for optical fibers used principally for optical telecommunications and the like, and especially relates to a manufacturing method and device for metal ferrules used as connector elements for optical fibers (hereinafter referred to as "metal ferrules") in which a metal ferrule is obtained from a tube-shaped electroformed layer that is grown by electroforming.

2. Description of the Related Art

A variety of cylindrical ferrules (ferrule: A cylindrical part for coaxially opposing the terminals of optical fiber strings to each other. It is used to connect the opposite ends of optical fiber strings.) are conventionally used as connector elements for connecting optical fibers developed principally for optical telecommunications.

Such a ferrule is conventionally manufactured in the following way: a mixture of zirconia powder and resin is formed by injection molding or extrusion molding into a cylindrical shape and is later baked around 500° C. for decomposing and removing the resin and in addition the same is baked around 1200° C. Thereafter, diamond abrasion is applied to a hole of the aforementioned ferrule (baked product) so as to adjust the hole diameter within the allowable margin of error, and mechanical processing such as grinding is applied to the center of the hole so as to make the periphery of the aforementioned ferrule a true circle.

However, the conventional methods of manufacturing ferrules have difficulties, as follows:

(1) An expensive molding device or metallic pattern is needed for injection molding or extrusion molding and, in addition, such metallic patterns are easily abraded by the zirconia powder, and therefore special processing such as applying cemented carbide to the molding surface of the metallic pattern is necessary, and the abrasion must constantly be monitored so that repairing or changing of the metallic pattern can be performed when necessary.

(2) Time and special skills are needed to perform the diamond abrasion of the piercing hole, and therefore it is difficult to increase productivity.

(3) The baking temperature is high, which requires a great deal of energy at high cost.

(4) According to the type of physical-contact connection (hereinafter referred in short to as a "PC connection"), the ferrule of which material is ceramics, the PC connection must be processed on its end face to form a convex spherical surface, an inclined convex spherical surface, a flat surface, an inclined flat surface, or the like, but the material (ceramics) that is used makes such processing difficult.

To solve these problems, for example, the electroforming method shown in PCT/JP99/No. 06570 (Title of the Invention "Optical fiber connector and ferrule used therein and manufacturing method for the ferrule") is used to form a ferrule that is made of a metallic material. Such process as included herein is one in which the metal is accumulated around a core string member (the external diameter thereof is the same as the internal diameter of the ferrule) that is dipped in an electroforming cistern to form a tube-shaped electroformed layer, one in which the core string member is removed from the tube-shaped electroformed layer, and one in which the formed electroformed layer is cut into a prescribed length so as to obtain the necessary ferrule.

However, in this electroforming method, the length of the tube-shaped electroformed layer (namely, a part of the core string member that is dipped in the electroforming liquid) is restricted by the depth of the electroforming cistern, and therefore the volume obtained by one electroforming process is small. Also, this is batch-type electroforming processing wherein a number of core string members are repetitively dipped and taken out, and therefore the method is not suitable for mass-production. Also, in order to improve the concentricity, circularity, and cylindricity of the electroformed layer, it is necessary to maintain a fixed distance between the core string member as a cathode and an anode under electroforming, and therefore a contrivance for an electroforming cistern, and placement of electrodes or structure. Furthermore, it is difficult to make the circularity, cylindricity or surface roughness of the tube-shaped electroformed layer within the required accuracy limits.

The Purpose of the Invention

The present invention is based on the aforementioned situation and the purpose of the present invention is to provide a manufacturing method and device by which metal ferrules are continuously manufactured by an electroforming method in such a way as to increase the mass-production of such metal ferrules and to decrease the cost of manufacturing them, as well as to ensure the uniformity of the concentricity, circularity, cylindricity, and electroforming accumulation of the internal/external diameters of the electroformed layer.

A second purpose of the present invention is to provide metal ferrules to be used in practice in the forming process of the tube-shaped electroformed layer.

A third purpose of the present invention is to provide metal ferrules in such a way as to prevent the arising of small hollows in the tube-shaped electroformed layer, especially in the internal wall, and to minimize the depletion of optical signals by removing bubbles in the electroforming liquid in the early stage of electroforming and improving the wetness of the surface of the core string member.

A fourth purpose of the present invention is to provide a manufacturing device for metal ferrules that enables the confirmation of the difference of the electroforming liquid pressure in the vertical direction, convenience for change and maintenance of anodes, and the growth of the electroformed layer, in the electroforming process, by adopting a plurality of electroforming cisterns used in steps as a multitiered structure.

SUMMARY OF THE INVENTION

In order to achieve the aforementioned purposes, the present invention's method of manufacturing metal ferrules is characterized such that, in the electroforming method where a metal ferrule is grown in the electroforming process as a cathode opposed to the anode furnished in the electroforming cistern, an electroformed layer having a cylindrical internal hole is grown in the electroforming cistern, on the cathode side thereof, with the growth of said electroformed layer being guided by an internal-diameter-formation member whose external diameter is the same as the internal diameter of the cylindrical metal ferrule to be manufactured, and such that a tube-shaped electroformed layer that, in the process of being pulled up from the aforementioned electroforming cistern, is grown so as to have the intended external diameter is cut to the prescribed dimensions when outside the aforementioned electroforming cistern.

Also, the present invention's method of manufacturing said metal ferrules is characterized such that, on the cathode side that is opposed to the anode furnished in the electroforming cistern, an internal-diameter-formation member whose external diameter is the same as the internal diameter of the cylindrical metal ferrule to be manufactured is supplied as a cathode core member upwardly through the bottom position of the aforementioned electroforming cistern, around which is grown, in the electroforming cistern and on the cathode side thereof, a tube-shaped electroformed layer having a cylindrical internal hole, and such that, in the process of lifting from the aforementioned electroforming cistern such tube-shaped electroformed layer together with the aforementioned internal-diameter-formation member, the aforementioned tube-shaped electroformed layer, which is grown so as to have the intended external diameter, is cut, when outside the aforementioned electroforming cistern, to the intended dimensions.

Also, the present invention's method of manufacturing said metal ferrules is characterized such that, on the cathode side that is opposed to the anode furnished in the electroforming cistern, a cylindrical member whose internal diameter is the same as the internal diameter of the cylindrical metal ferrule to be manufactured is supplied as a cathode core member upwardly through the bottom portion of the aforementioned electroforming cistern, around which a tube-shaped electroformed layer having a cylindrical internal hole is grown in the electroforming cistern, on the cathode side thereof, and such that, in the process of lifting such tube-shaped electroformed layer together with the aforementioned cylindrical member from the aforementioned electroforming cistern, the aforementioned tube-shaped electroformed layer, which is grown so as to have the internal external diameter, is cut to the intended dimensions when the aforementioned cylindrical member is outside the aforementioned electroforming cistern.

Furthermore, the present invention's method of manufacturing said metal ferrules is characterized such that, on the cathode side that is opposed to the anode furnished in the electroforming cistern, an internal-diameter-formation member whose external diameter is the same as the internal diameter of the cylindrical metal ferrule to be manufactured is supplied upwardly through the bottom portion of the aforementioned electroforming cistern, around which a tube-shaped electroformed layer having a cylindrical internal hole is grown in the electroforming cistern, on the cathode side thereof, and such that a spacer with an intended pitch is previously furnished in the aforementioned internal-diameter-formation member, which is pulled up with the aforementioned grown tube-shaped electroformed layer, and such that said spacer is such that at its upper and lower ends there are formed the necessary faces of the upper and lower terminals of the metal ferrule to be manufactured.

In these manufacturing methods, a uniform thickness from the outside of the inner space to the circumference of the electroformed layer at any position along the length of that layer is secured by rotating at an appropriate velocity, during the process of the aforementioned lifting, the aforementioned tube-shaped electroformed layer that is grown by electroforming.

In the same way, in these manufacturing methods, by measuring the external diameter of the tube-shaped electroformed layer that is lifted from the aforementioned electroforming cistern, the lifting velocity of the aforementioned tube-shaped electroformed layer can be controlled and the internal dimension of the external diameter of the region lifted out of the aforementioned electroforming cistern can be maintained.

Also, the first embodiment of the present invention is characterized such that, as a dummy of the aforementioned tube-shaped electroformed layer, a cathode core member whose external diameter and axis are the same as those of the aforementioned internal-diameter-formation member is vertically supported in the aforementioned electroforming cistern so as to contact the upper end of the aforementioned internal-diameter-formation member at the beginning of the electroforming process and so that a tube-shaped electroformed layer is grown on the surface of said internal-diameter-formation member.

In this case, it is desirable that a power supply (a direct-current power supply, or an alternating-current power supply that is adjusted to load a certain biased voltage between the cathode and the anode) is connected with the aforementioned internal-diameter-formation member and/or cathode core member so as to apply cathode voltage to the aforementioned grown electroformed layer.

Also, in an embodiment of the present invention, the aforementioned cathode core member, which can be in a bar-shape, is desirably in a cylindrical shape, and it is also necessary to apply appropriate air pressure inside so as to prevent the electroforming liquid in the aforementioned electroforming cistern from intruding into the aforementioned electroformed layer during the growing process.

Furthermore, for an embodiment of the present invention, it is better that a member of small diameter is connected with the top portion of the aforementioned internal-diameter-formation member, that said small-diameter member is pierced through a cylindrical cathode core member so as to extend upwardly, and that upward pressure is applied thereto so as to maintain the verticality of the aforementioned internal-diameter-formation member so as to prevent shaking (and thereby to increase the circularity, concentricity and cylindricity) of the aforementioned internal-diameter-formation member.

Also, it is necessary to control, in the bottom portion of the aforementioned electroforming cistern, the upward movement of the aforementioned internal-diameter-formation member at a specified velocity in the process of lifting the grown tube-shaped electroformed layer. In order to compensate for the unavoidable depletion that is generated by electronic or mechanical waste in the electroforming process, the external-diameter of the internal-diameter-formation member should be within the allowable error limits. Also, cutting is done of the aforementioned tube-shaped electroformed layer only under the condition that the aforementioned internal-diameter-formation member is not cut (in the case where an internal-diameter-formation member whose external diameter is the same as the internal diameter of the cylindrical metal ferrule to be manufactured is used as a cathode core member and only the metal ferrule is removed after cutting), or cutting is done of the aforementioned tube-shaped electroformed layer together with the aforementioned internal-diameter-formation member (in the case where the cylindrical member whose internal diameter is the same as the internal diameter of the cylindrical metal ferrule to be manufactured is used as a cathode core member and is left inside the metal ferrule).

In particular, the process of removing bubbles arising in the early stage of the beginning of the aforementioned continuous electroforming is included, whereby the arising of hollows in the aforementioned continuously electroformed layer is effectively prevented.

The metal ferrules that are manufactured by such manufacturing methods and that are constituted of a cylindrical metal layer having a hole whose internal diameter enables the aforementioned optical fibers to be pierced, have good workability and excellent productivity.

Furthermore, to attain the above-mentioned purposes, the present invention's device for manufacturing said metal ferrules is furnished with (1) a means of lifting a tube-shaped electroformed layer that is grown in the aforementioned electroforming cistern, (2) a means of measuring the external diameter of the aforementioned electroformed layer outside the aforementioned electroforming cistern in the process of the lifting the electroformed layer, and (3) a means for controlling the lifting velocity of the aforementioned lifter using the result of such measurement as a predicted measurement value in said manufacturing device, which, in the electroforming cistern, grows a tube-shaped electroformed layer having an internal hole whose diameter is the same as the internal diameter of the cylindrical metal ferrule being manufactured on the cathode side of the aforementioned electroforming cistern, opposite to the anode.

In this case, it also is desirable for an embodiment of the present invention to furnish an internal-diameter-formation member that has the same external diameter as that of the internal diameter of the aforementioned metal ferrule and that is able to guide the growth thereof so as to form the aforementioned tube-shaped electroformed layer, and to furnish a means of supplying the aforementioned internal-diameter-formation member upwardly through the bottom portion of the aforementioned electroforming cistern and to grow around the circumference of said internal-diameter-formation member a tube-shaped electroformed layer having a cylindrical internal hole in the electroforming cistern, on the cathode side thereof. Also, instead of the internal-formation member, a cylindrical member whose internal diameter is the same as that of the internal diameter of the aforementioned metal ferrule can be adopted as a cathode core member to be used as it is for an internal-constituent member of the grown tube-shaped electroformed layer.

Further, it is recommended to furnish, in the process of lifting the tube-shaped electroformed layer from the aforementioned electroforming cistern, a means of cutting the tube-shaped electroformed layer that is grown so as to have a specified diameter.

Also, it is effective for an embodiment of the present invention that (1) the aforementioned internal-diameter-formation member that is lifted with the aforementioned grown tube-shaped electroformed layer be furnished with a spacer having a specified pitch, (2) appropriate surfaces of the upper and lower terminals of the metal ferrule to be manufactured are formed on the upper and lower ends of such a spacer, and (3) in the lifting of the aforementioned internal-diameter-formation member, there by a means of removing the tube-shaped electroformed layer formed between the aforementioned spacers from the aforementioned internal-diameter-formation member.

Furthermore, it is important for the present invention that an anode opposed to the aforementioned electroformed layer is placed so as to maintain a certain distance from the aforementioned electroformed layer so as to improve the circularity, concentricity, and cylindricity of the aforementioned electroformed layer, because the uniform-growing of the layer by electroformation is disordered if the distance between the anode and layer varies beyond a certain limit, and therefore it is effective to use an insoluble electrode such as platinum, gold, or titanium for the anode.

Also, it is important for the present invention to furnish a means of rotating, at a specified velocity in the process of the aforementioned lifting, the aforementioned tube-shaped electroformed layer that is being grown by electroforming, and to secure equal thickness from the outer edge of the inner space to the circumference direction of the electroformed layer at each point along the entire length thereof, so as to improve the circularity, concentricity, and cylindricity of the aforementioned electroformed layer.

Furthermore, for an embodiment of the present invention, the aforementioned purposes are attained by adopting an electroforming cistern with a multitiered structure.

DESCRIPTION OF THE PREFERRED EMBODIMENTS

Figure 1:
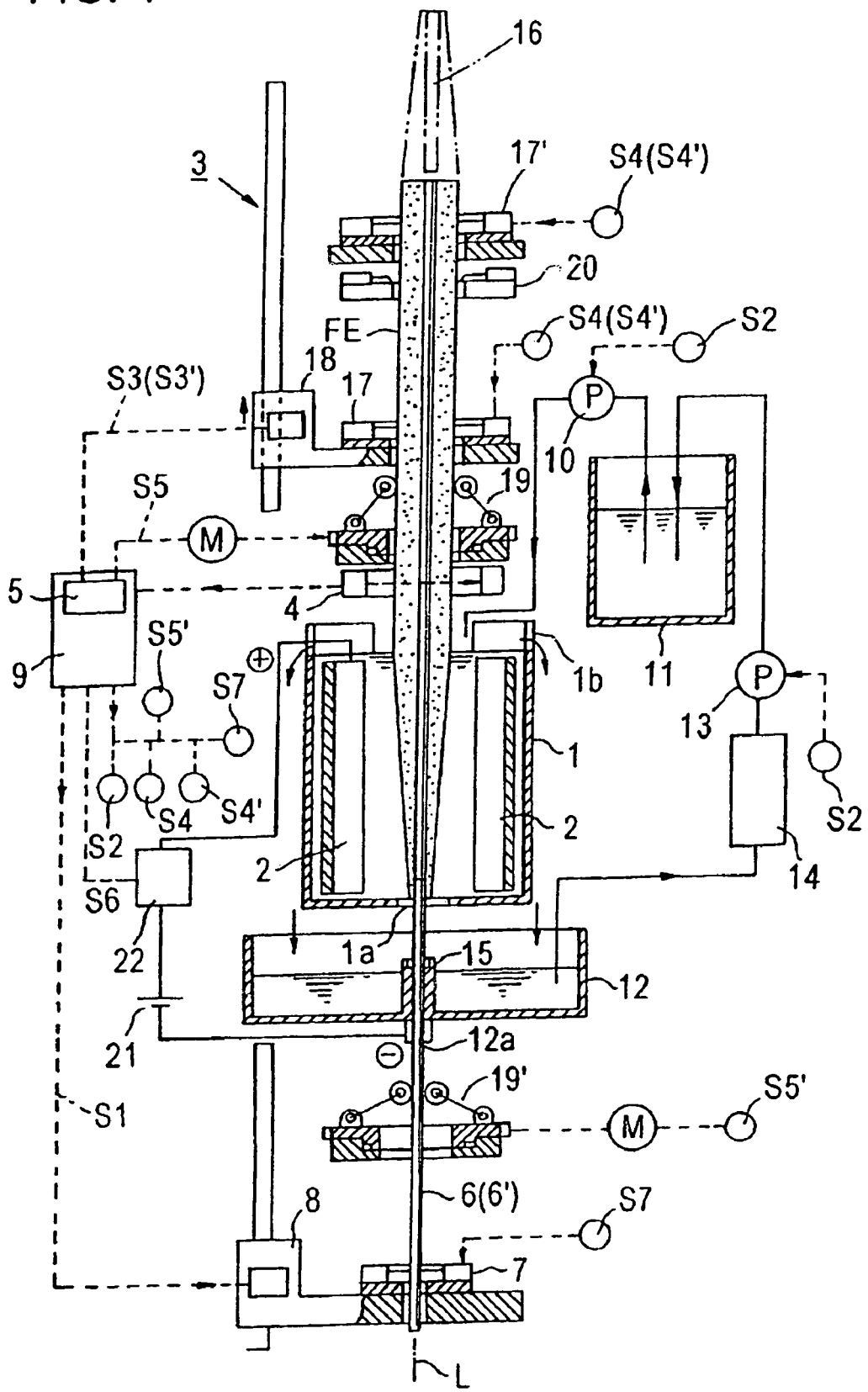
FIG. 1 is a schematic vertical section view of a device for electroforming manufacturing of metal ferrules used for optical fibers, illustrating an embodiment of the present invention.
Figure 2:
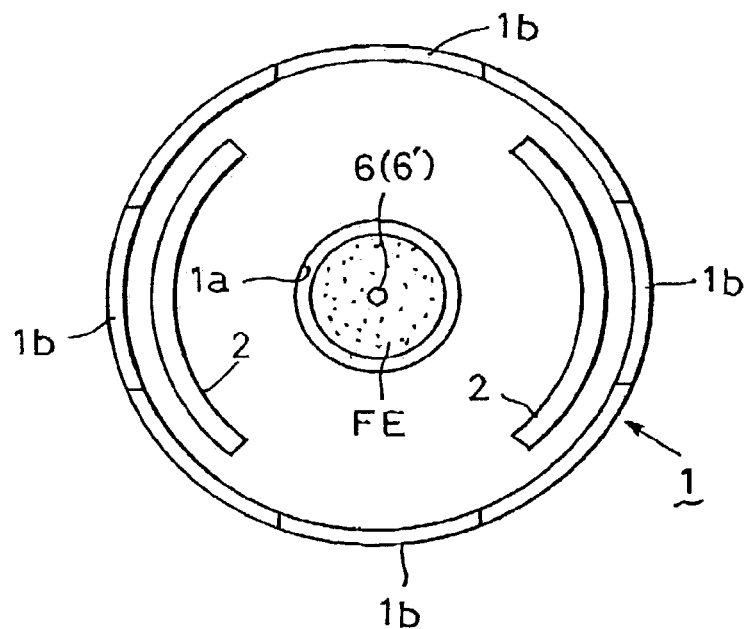
FIG. 2 is a plan view of the electroforming cistern of the same device for manufacturing metal ferrules.

The embodiment of the present invention is described in reference to the accompanying figures, which are described immediately below.

The First Embodiment

The first embodiment of the present invention is described as follows, with reference to the aforementioned figures. As shown by FIGS. 1 to 4, the present invention's device for manufacturing metal ferrules used for optical fibers grows, in the electroforming cistern 1, a tube-shaped electroformed layer (ferrule material) FE that has an internal hole whose diameter is the same as the internal diameter of the cylindrical metal ferrule (it is a connector element) to be manufactured on the cathode side of the electroforming cistern 1, with said cathode side being opposite the anode 2 (which is desirably composed of an insoluble material such as platinum, gold, or titanium). Said manufacturing device is furnished, in particular, with:

(1) a lifter 3 for lifting a tube-shaped electroformed layer FE that is grown in the electroforming cistern 1,
(2) a measurer 4 for measuring the external diameter of the electroformed layer FE outside the electroforming cistern 1 in the process of lifting the electroformed layer, and
(3) a controller 5 for controlling the lifting velocity of the lifter 3, using the result of such measurement as a predicted measurement value.

Further, the anode 2, which is opposite the electroformed layer FE, is placed so as to maintain a fixed distance from the aforementioned layer on the cathode side in the electroforming cistern 1) and is constituted so as to improve the circularity, concentricity, and cylindricity of the aforementioned electroformed layer FE, for example, by being placed in a cylindrical or arc shape around the aforementioned electroforming cistern as the center thereof (further, a group of nickel balls can be used as material for the anode).

For a more-detailed description, an internal-diameter-formation member 6 whose external diameter is the same as the internal diameter of the metal ferrule F is furnished in the electroforming cistern 1 and with growth-guidance the tube-shaped electroformed layer FE is formed (further, the internal-diameter-formation member 6 functions herein as a cathode, and a material of high rigidity, such as cemented carbide with corrosion-resistant plating, or stainless steel is used as the material thereof). For this reason, there is furnished at the bottom portion of the electroforming cistern 1 a hole 1*a* through which the internal-diameter-formation member 6 is vertically protruded into the electroforming cistern 1 from the lower side of the electroforming cistern 1. Further, in this embodiment, a support 7 is furnished to vertically support the internal-diameter-formation member 6, and for this support there is adopted a known clamping system that clamps the internal-diameter-formation member from the surroundings thereof and that is rotatable to the axis of the internal-diameter-formation member. Here in particular an elevator 8 (for example, a known elevating device is adopted) that controls the elevation of the support 7 is prepared, and the internal-diameter-formation member 6 is elevated at a specified micro-velocity through the elevator 8 in response to a control signal S1 from the control system 9 (a computerized control system, including the aforementioned controller 5) of the present invention. Also, the support 7 switches between clamping and releasing in response to a control signal S7 from the control system 9.

Electroforming liquid is supplied to the electroforming cistern 1 through a pump 10 from a storing cistern 11, and, in order to keep a constant level of the electroforming liquid in the electroforming cistern 1, the electroforming liquid can overflow via a brim 1*b* that is furnished on the upper edge of the electroforming cistern 1. Said overflowed electroforming liquid is received by a receiving cistern 12 that is furnished under the electroforming cistern 1. Said receiving cistern 12 is so constituted as to receive the electroforming liquid that is flowing down from the hole 1*a* (thereby the surface wetness of the cathode core member (dummy) described later is improved in the early stage of electroforming).

Also, the electroforming liquid in the receiving cistern 12 is fed back to the storing cistern 11 by a pump 13 through a filter 14. Further, in a leading hole 12*a* that is formed in a tube that protrudes upwards from the bottom of the cistern 12 to above the level of the liquid and that is used when the internal-diameter-formation member 6 is pierced and a liquid-sealing member 15 is furnished to at least of the top of the tube (the internal-diameter-formation member 6 is free to slide against the aforementioned liquid-sealing member 15). Further, the control of the driving of the pumps 10 and 13 is performed by a control signal S2 from the aforementioned control system 9.

Furthermore, in this embodiment, in order to assist the growing of electroformed layer at time of the beginning of electroforming, a cathode core member 16 is adapted to make contact with the upper end of the internal-diameter-formation member 6, the cathode core member 16 having an external diameter and axis that are the same as those of the internal-diameter-formation member, and said cathode member 16 can be inserted, as a dummy of the tube-shaped electroformed layer FE, into the electroforming cistern 1 from the upper direction and then lifted by the aforementioned lifter 3. In this embodiments, the lifter 3 is composed of (1) two supports 17 and 17' (a known clamping system that clamps the cathode core member 16 from the surroundings thereof is adopted) that are the upper and lower tiers upwardly placed in the electroforming cistern 1; and (2) an elevator 18 (for example, a known elevating-system device is adopted). Further, the support 17 is moved up and down by the elevator 18 while the support 17' is maintained at a static level so as to be held in a fixed position by a frame (not shown). Then, a tube-shaped electroformed layer FE is grown in the electroforming liquid. That growing stops when the electroformed layer FE is at a position above the surface of the electroforming liquid while the dummy is vertically supported through the support 17 and the elevator 18 is elevated.

Further, the cathode core member 16 (or the electroformed layer FE) is moved up or down at a specified velocity through the support 17 by control signals S3 and S3' from the control system 9 of the present invention. Also, each of the supports 17 and 17' clamps or releases independently by means of the control signals S4 and S4' from the control system 9.

Figure 3:
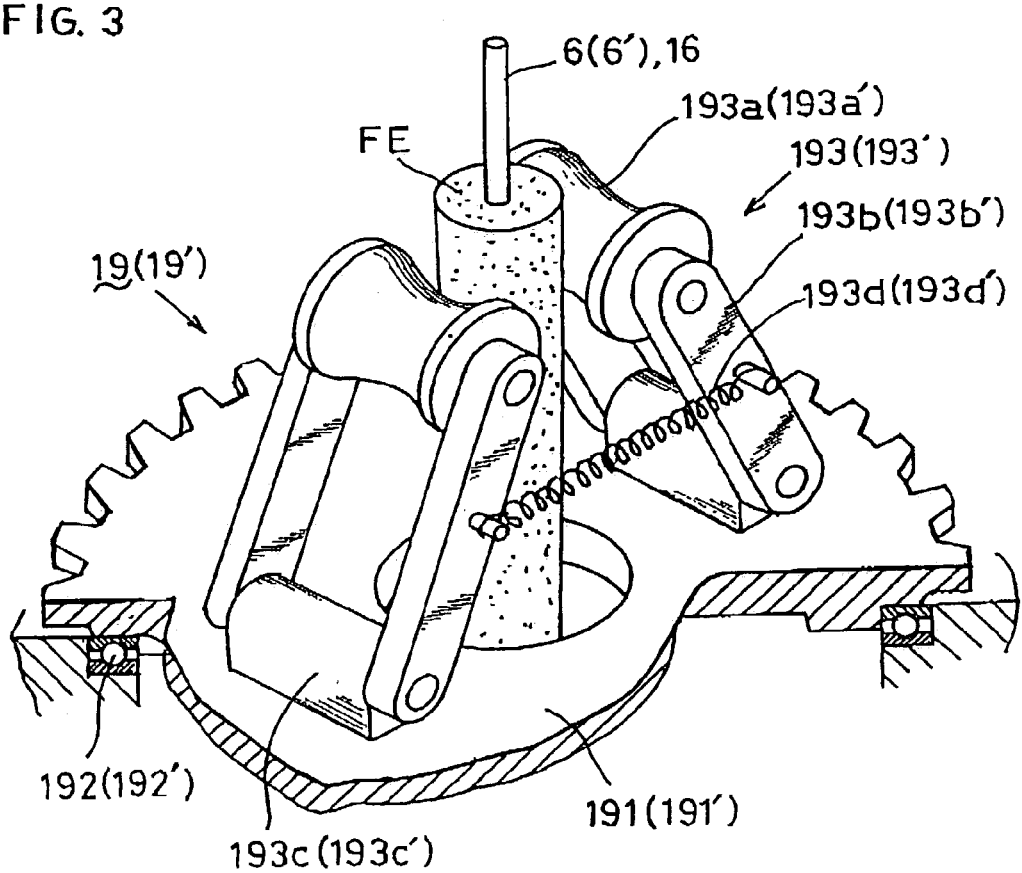
FIG. 3 is a perspective view illustrating the principal parts of a rotator of the same device for manufacturing metal ferrules.

There also are furnished rotators 19 (19') for rotating, at specified velocities R1 and R2, the tube-shaped electroformed layer FE (including a dummy as an object to be lifted) that is being grown by the electroforming process. Accordingly, the internal-diameter-formation member 6 can maintain a uniform thickness of the electroformed layer FE from the outside of its inner space to its circumference along its entire length in the process of the lifting thereof by control signals S5 and S5' so as to improve the circularity and concentricity of the electroformed layer FE. The rotators 19 (19') herein are desirably constituted, for example, as shown in FIG. 3.

That is to say, in this embodiment, ring-shaped rotators 191 (191') that rotate around the vertical axial line L, which is common with the tube-shaped electroformed layer FE (or a dummy) and the internal-diameter-formation member 6, are supported by a support frame (not shown) through bearings 192 (192') on which a right-and-left set of two clamps 193 (193') are furnished. Further, gear teeth are formed on the circumferential edge of each of the rotators, and they connect with an electric motor M (for example, a stepping motor) through an appropriate gear transmission system (not shown), and the starting, stopping, and velocity thereof are controlled by the control signals S5 and S5' from the control system 9 as described above. These clamps 193 (193') axially support levers 193*b* (193*b'*) that axially support rollers 193*a* (193*a'*) that are drums having a narrow-in-the-middle shape, under the condition of free shaking on axis-mounted stands 193c (193c') that are furnished on the aforementioned rotators 191 (191'). In addition, pulling coil springs 193d (193d') are furnished between the levers 193b (193b').

In this constitution, the electroformed layer FE (dummy) and the internal-diameter-formation member 6 can be sandwiched and held between the rollers 193a (193a'). In addition, the rotation of the rotators 191 (191') can be transmitted to the electroformed layer FE (dummy) and the internal-diameter-formation member 6. Further, in this embodiment, the structure of the rotators 191 (191') of the electroformed layer FE and that of the internal-diameter-formation member 6 is the same, although different structures are allowed and appropriate known means can be substituted.

Figure 4:
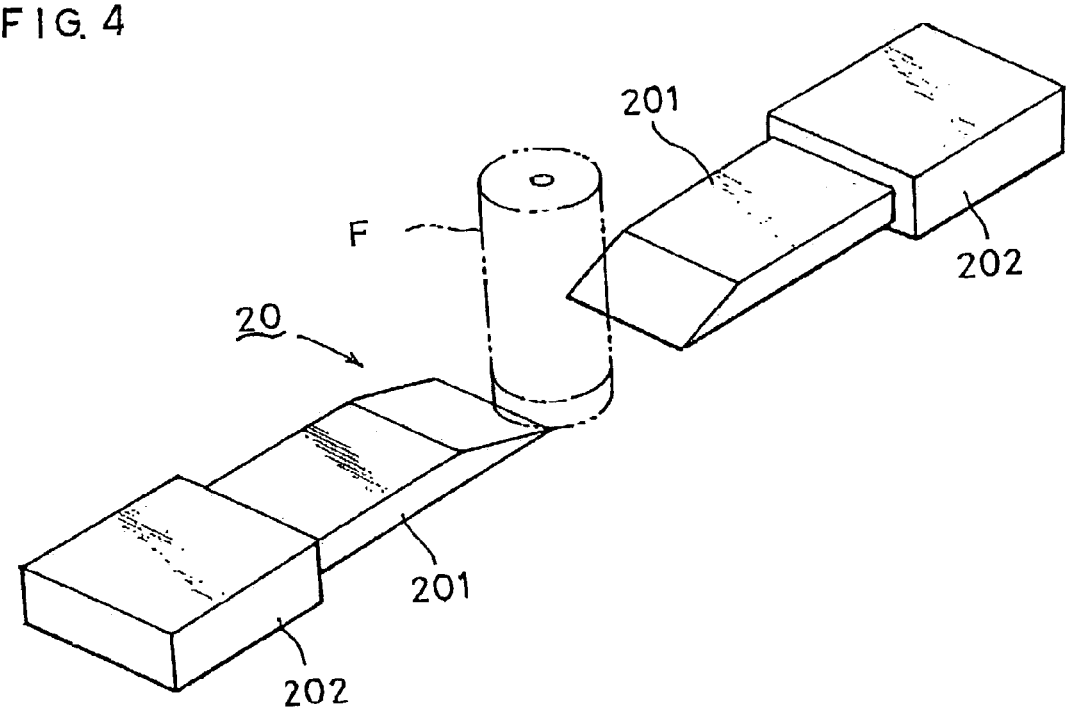
FIG. 4 is a perspective view illustrating the principal parts of a cutter of the same device for manufacturing metal ferrules.

Also, in this embodiment, a cutting edge 20 is furnished for cutting the electroformed layer FE, in the process of lifting thereof, into a specified length as a ferrule to be used. Such cutter is constituted, for example, so as to cut with cutters 201 processing from the right and left sides of the electroformed layer FE, as shown in FIG. 4. Each of the cutters 201 is driven back and forth by an actuator 202 in response to a control signal S6 from the control system 9.

Further, after the elevator 18 is elevated in accordance with the cutting length (length of the ferrule) of the electroformed layer FE, the support 17' is first clamped and then cutting occurs. Thereafter, the support 17 in the lifter 3 changes the holding region thereof on the electroformed layer FE (lowering the clamping region). Therefore, the clamping of the support 17 is stopped by a control signal S4' from the control system 9, and then the elevator 18 drops in response to a control signal S3. Then, after the support 17 clamps, the support 17' releases the clamp in response to the control signal S4.

Also, an optical sensor utilizing laser beams (for example, a measuring device utilizing a light-emitting diode or the like) is desirably used for the aforementioned measurer 4 for measuring the external diameter of the electroformed layer FE outside the electroforming cistern 1 in the process of lifting the electroformed layer. The measurer 4 herein is not limited to the above-mentioned optical sensor (other available known measuring devices can be used).

Further, in this embodiment, the number 21 denotes a power supply (a rechargeable battery, or power obtained through a direct-alternating current converter from an alternating-power supply obtainable on the market, or furthermore, such power supply as an adjusted alternating-current power supply as mentioned below) of voltage (direct-current voltage, or alternating-current voltage adjusted to load a certain biased voltage between the cathode and the anode) applied between the anode 2 and the electroformed layer FE, and the number 22 denotes a voltage regulator that is controlled by a control signal S6 from the control system 9.

Figure 5:
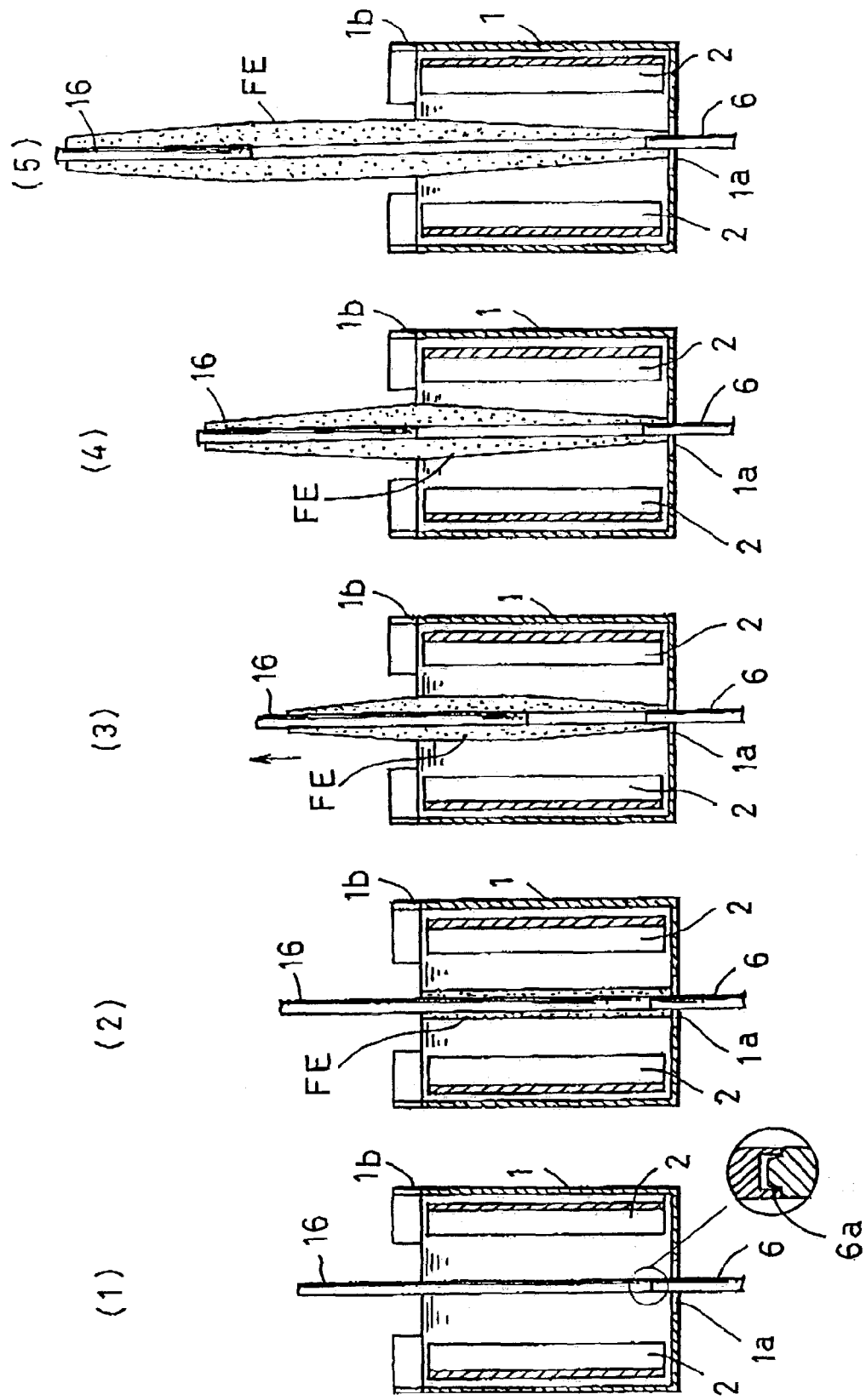
FIG. 5 consists of five separate illustrations that of the five steps of the electroforming process of the first embodiment of the present invention.

The process of manufacturing said metal ferrules F by means of the above-mentioned manufacturing device of the present invention is as follows. First, as shown in FIG. 5, the cathode core member 16 (dummy) that is clamped by the support 17 (see FIG. 1) is inserted into the electroforming cistern 1 by the action of the elevator 18 (see FIG. 1) so as to make contact with the internal-diameter-formation member 6, which is placed over the bottom portion of the electroforming cistern 1. Further, in this embodiment, at the end of the internal-diameter-formation member 6 is formed a small passageway 6a with which the end of the dummy is to be engaged under the condition of free engagement/disengagement and of free rotation (otherwise, because the internal diameter of the dummy corresponds to the external diameter of the internal-diameter-formation member 6, the engagement thereof under the condition of possible sliding to the end side of the internal-diameter-formation member 6 is possible).

Under this condition, when electroforming begins, a metal layer begins to be formed by electroforming in the region of the cathode core member 16 that is dipped in the electroforming liquid and on the external circumferential surface of the internal-diameter-formation member 6 that is protruding into the electroforming liquid (see (2) of FIG. 5). At the stage where the electroformed layer FE has grown to the necessary thickness (thick enough not to give rise to damages such as cracks and to exfoliate smoothly against the internal-diameter-formation member 6, by being able to rotate with the dummy side if the dummy is rotated by the rotator 19 and a twisting force is applied to the metal layer between itself and the internal-diameter-formation member 6 which is not rotated, that is to say, around 0.5 $\mu$m thick, for example), the rotator 19 is caused to rotate and also the dummy is lifted by the lifter 3. At this time, the rotator 19' also is rotated, and the driving velocity of the electric motors M of each of the rotators 19 (19') is separately controlled by control signals from the control system 9 so as to make the rotation-speed difference between the two rotators either zero or a specified amount.

In this lifting process, the lower end of the dummy leaves the upper end of the internal-diameter-formation member 6 while the tube-shaped electroformed layer FE that is formed by the electroforming work continues to grow, maintaining the internal diameter of the internal-diameter-formation member 6 (see (3) of FIG. 5). When the dummy is elevated and the tube-shaped electroformed layer FE reaches the level of the measurer 4 (see (4) and (5) of FIG. 5), the external diameter of the tube-shaped electroformed layer FE is measured from that stage. The lifting velocity of the lifter 3 decides the external diameter of the tube-shaped electroformed layer FE that is being lifted from the electroforming liquid. Then, as a result of the measurement of the external diameter of the tube-shaped electroformed layer FE by the measurer 4, when the specified diameter (ferrule external diameter) is reached, the lifting velocity of the lifter 3 is controlled by feed-back control so as to maintain the value thereof. In this way, the measured value by the measurer 4 is used as a predicted value (equivalent to the set value) to keep a constant external diameter of the tube-shaped electroformed layer FE.

In the condition where the measured external diameter of the tube-shaped electroformed layer FE maintains the prescribed value, when the length of the tube-shaped electroformed layer FE by the lifter 3 reaches the prescribed length of the ferrule, the support 17' clamps the immediate upper region of the cut portion of the tube-shaped electroformed layer FE in response to a control signal from the control system 9. Under this condition, in response to control signals from the control system 9, the cutting edge 20 is caused to cut the tube-shaped electroformed layer FE. Later, by in response to control signals from the control system 9, the aforementioned support 17 changes the holding region (that is to say, release of the clamp by the support 17, lowering of the elevator 18, and reclamping at a new position by the support). Further, the holding region of the support 17 is changed after cutting in this embodiment, but in the other embodiment, cutting can be done after the change of the holding region of the support 17 after the clamp of the supporting 17'.

Also, the part that is first cut from the tube-shaped electroformed layer FE (including the dummy) is removed in an appropriate manner after releasing the clamp of the support 17', and the pieces that are cut later from the tube-shaped electroformed layer FE are taken as ferrules F in an appropriate way and are placed in storage as specified. Then, again, in the course of the growth of the tube-shaped electroformed layer FE, the elevator 18 is elevated while the clamped condition is maintained by the support 17 (as described above, the support 17' is in a clamp-released condition).

Further, in this embodiment, the dummy is hollow, and from the upper end of which a pressurized gas (a gas such as air) is supplied to prevent the electroforming liquid from sinking into the tube-shaped electroformed layer in the electroforming cistern 1. In this case, a known means of supplying the pressurized gas (not shown) can be used. The purpose of this is to prevent the electroforming liquid from disturbing the condition where the internal diameter of the tube-shaped electroformed layer FE is retained at a precise value by the internal-diameter-formation member 6.

Furthermore, it is possible to connect a member of small diameter (not shown) on the top portion of the internal-diameter-formation member, and for the same member to pierce through the cylindrical cathode core member (dummy) and be extended upwardly with an upward pressure so as to maintain the vertically of the internal-diameter-formation member 6 so as to eliminate the shaking thereof (thereby to increase the circularity, concentricity, and cylindricity of the growing electroformed layer).

Also, considering that the tip portion (the part exposed to the inside of the electroforming cistern) of the internal-diameter-formation member gradually becomes thinner in the process of electroforming, it is effective to control the internal-diameter-formation member 6 so that it is elevated at a micro-velocity by the elevator 8 so as to proceed to the allowable extent into the tube-shaped electroformed layer that is formed. Such control of the elevator 8 is effected via the control signal S1 from the control system 9.

Further, the internal diameter of the tube-shaped electroformed layer FE to be manufactured in this embodiment is, for example, 0.05 mm–0.13 mm, and the external diameter thereof is, for example, 1 mm–1.2 mm. Also, for the electroformed layer, such materials such as nickel, iron, copper, cobalt, tungsten, or alloys thereof can be used. Therefore, as for the electroforming liquid, the metal constituents mentioned above are contained in the condition of a solution or flotation liquid (suspension liquid). For example, there is used an aqueous solution such as nickel sulfamate, nickel chloride, nickel sulfate, ferrous oxide sulfamine, ferrous oxideborofluoride, copper pyrophosphate, copper borofluoride, copper silicafluoride, copper titanfluoride, copper alkanolsulfonate, cobalt sulfate or sodium tungstate, or a flotation liquid (suspension liquid) that is composed of water with the fine powder of silicon carbide, tungsten carbide, boron carbide, zirconium oxide, silicon nitride, alumina, or diamond. Further, a solution containing sulfamate is extremely useful as an electroforming liquid because it enables easier electroforming, is chemically stable, and dissolve easily.

Further, in this embodiment, because the metal constituents of the electroforming liquid are to be materials composing metal ferrules used for optical fibers, it is desirable that such materials be easy-to-cut materials, for example, nickel or nickel alloys such as nickel/cobalt alloys, if the metal ferrules are for optical fibers for PC connections.

Also, for the internal-diameter-formation member 6 or the cathode core member 16 as a dummy, such materials as a stainless alloy (such as SUS304 in the JIS Standard) wire rod are used. As such wire rods, the ones having a diameter of 1.25±0.2 $\mu$m, manufactured by an extrusion method with a die or wire-drawing method by ductile extension, can be obtained easily.

Also, plus or minus direct currents are applied to the anode 2 that is connected with the power supply and the tube-shaped electroformed layer FE of the cathode side that is electrically connected to the power supply 21 through the internal-diameter-formation member 6 or the cathode core member 16, in the case of which the current density normally used is 4–20 A/dm$^2$. In this case, the pH of the electroforming liquid is kept on the acid side (pH 3–6), preferably pH 4–5. In this case, for example, within 12 hours after the application of power, and usually within 3–8 hours, the tube-shaped electroformed layer FE can be thickened to the intended diameter in the electroforming cistern 1, though the result is subject to the depth of the electroforming liquid.

Also, organic impurities are regularly removed from the electroforming liquid, by using, for example, active carbon. Also, prior to the electroforming, it is recommended to dip a different cathode such as a nickel-plated iron corrugated plate in the electroforming liquid and to apply a direct current between that plate and the anode 2 at a low-current density of around 0.2 A/dm$^2$ so as to remove in advance any existing inorganic impurities, such as steel, from the electroforming liquid.

Further, it is possible to utilize the tube-shaped electroformed layer, after it has been cut to the prescribed length in accordance with the intended use thereof, as a metal ferrule without any other processing, but usually cutting is applied to the outside of tube-shaped electroformed layer with sub-micron accuracy (within ±0.5 $\mu$m) so as to make a true circle by NC mechanical processing or the like. In the present invention, if the difference between the internal and external diameters of the tube-shaped electroformed layer is 2 mm or less, the eccentricity of the metal ferrule as a product can easily be within 0.5 $\mu$m. In particular, by keeping a certain space between the anode 2 and the tube-shaped electroformed layer, and in addition, by rotating the tube-shaped electroformed layer by the rotator 19, the eccentricity can be kept low if the accumulation thickness is large.

The Second Embodiment

Figure 6:
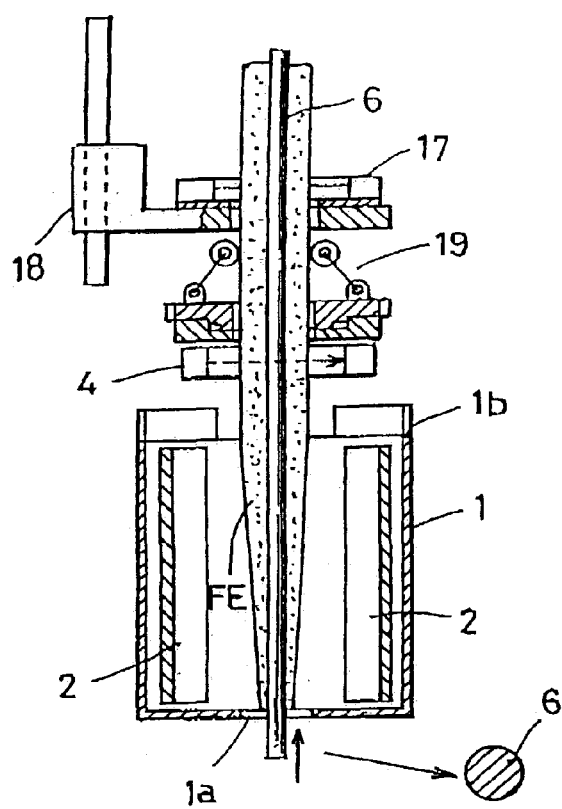
FIG. 6 is a schematic vertical-section side view of the principal parts of an electroforming cistern, illustrating a second embodiment of the present invention.

The second embodiment of the present invention is described as follows. Herein, the cathode core member 16 (dummy) shown in the first embodiment is not used. As a cathode opposed to the anode furnished in the electroforming cistern 1, the internal-diameter-formation member 6, whose external diameter is the same as the internal diameter of the cylindrical metal ferrule to be manufactured, is supplied upwardly through the bottom portion of the aforementioned electroforming cistern to be directly supported at its upper end by the support 17. In the electroforming liquid, around said internal-diameter-formation member 6, a tube-shaped electroformed layer FE having a cylindrical internal hole is grown on the cathode side of the electroforming cistern 1 (see FIG. 6). Also, the support 7 and the elevator 8 are not used. Further, the other constituents and controls are the same as in the first embodiment and are not described herein.

Figure 7:
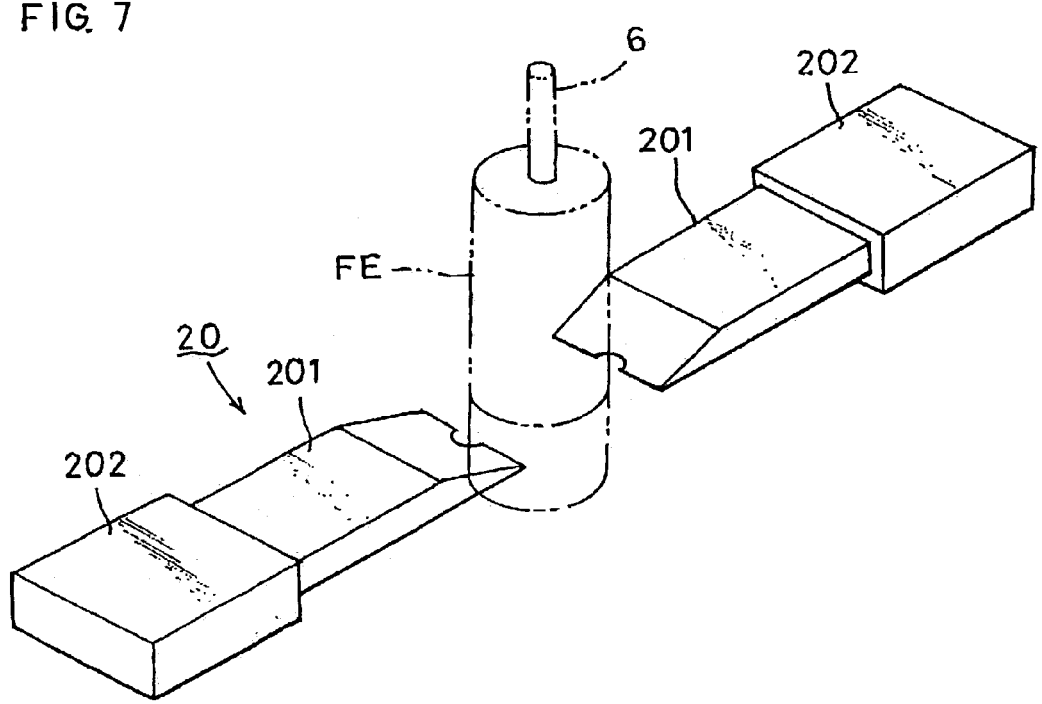
FIG. 7 is a perspective view illustrating the principal parts of a cutter, used in a second embodiment of the present invention.

In this case, for the cutting edge 20, it is recommended to form a cutting edge so as to cut only the tube-shaped electroformed layer FE, without cutting the internal-diameter-formation member 6, as shown in FIG. 7, for example. Then, the cut pieces (ferrules) of the tube-shaped electroformed layer after cutting are upwardly taken out by an appropriate means when the holding region of the support 17 is changed. Thereby, the internal-diameter-formation member can be reused.

The Third Embodiment

Figure 8:
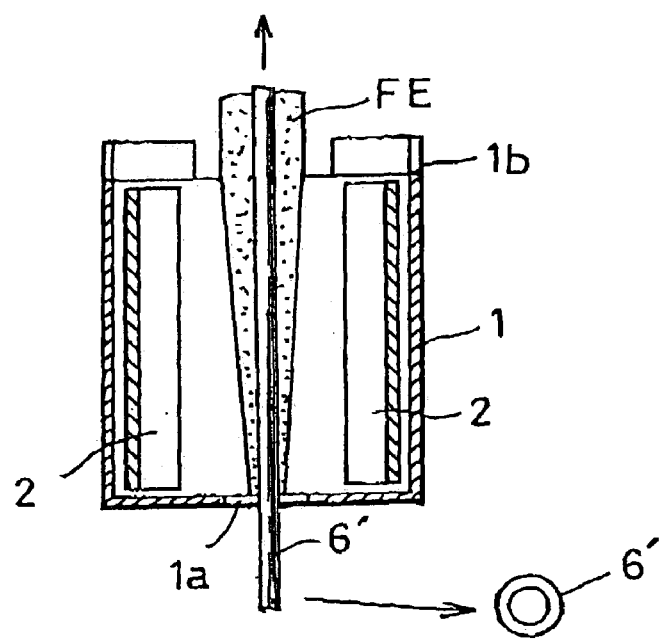
FIG. 8 is a schematic vertical-section side view of the principal parts of an electroforming cistern, illustrating a third embodiment of the present invention.

The third embodiment of the present invention is described as follows. Herein, instead of the internal-diameter-formation member 6 in the second embodiment, a cylindrical member 6' whose internal diameter is the same as the internal diameter of the necessary metal ferrule (ferrule) is used (see FIG. 8). Also, the material thereof is desirably the same as the metal accumulated around the member 6' by the electroforming (for example, when a nickel alloy is accumulated, the member 6' is of the same material). In this case, the cutting edge 20, which is used in the first embodiment (see FIG. 4), cuts the member 6' together with the electroformed layer in the surroundings thereof. Herein, the member 6', as a part of the ferrule, is left in the electroformed layer. Further, the other constituents and controls are the same as in the first embodiment and are not described herein.

The Fourth Embodiment

Figure 9:
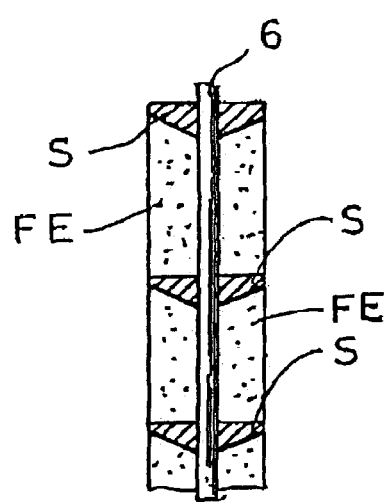
FIG. 9 is a schematic vertical-section side view of the principal parts of an electroforming cistern, illustrating a fourth embodiment of the present invention.

The fourth embodiment of the present invention is described as follows, with reference to FIG. 9. Herein, in the internal-diameter-formation member 6 that is lifted together with the grown tube-shaped electroformed layer FE, a spacer S (composed of a nonconductive material, such as ceramic) having a specified pitch is previously furnished, and there is formed in the upper and lower ends a necessary face (such as a taper face, back-taper face) of the lower and upper terminals of the metal ferrule to be manufactured. Also, as shown in the second embodiment, the tube-shaped electroformed layer is accumulated and formed between the aforementioned spacers when the internal-diameter-formation member 6 is lifted.

Also, in the upper region of the electroforming cistern 1, there is furnished an appropriate means (not shown) of removing the formed tube-shaped electroformed layer FE from the internal-diameter-formation means. Herein, for example, the adopted method is that the internal-diameter-formation member 6 and the tube-shaped electroformed layer FE of a specified length are previously left by such contrivance for spacer-removing by adopting a division-type spacer, especially of a vertical division-type, and later the tube-shaped electroformed layer FE is removed from the internal-diameter-formation member 6. Further, the other constituents and controls are the same as in the first embodiment and are not described herein.

Other Embodiments

Figure 10:
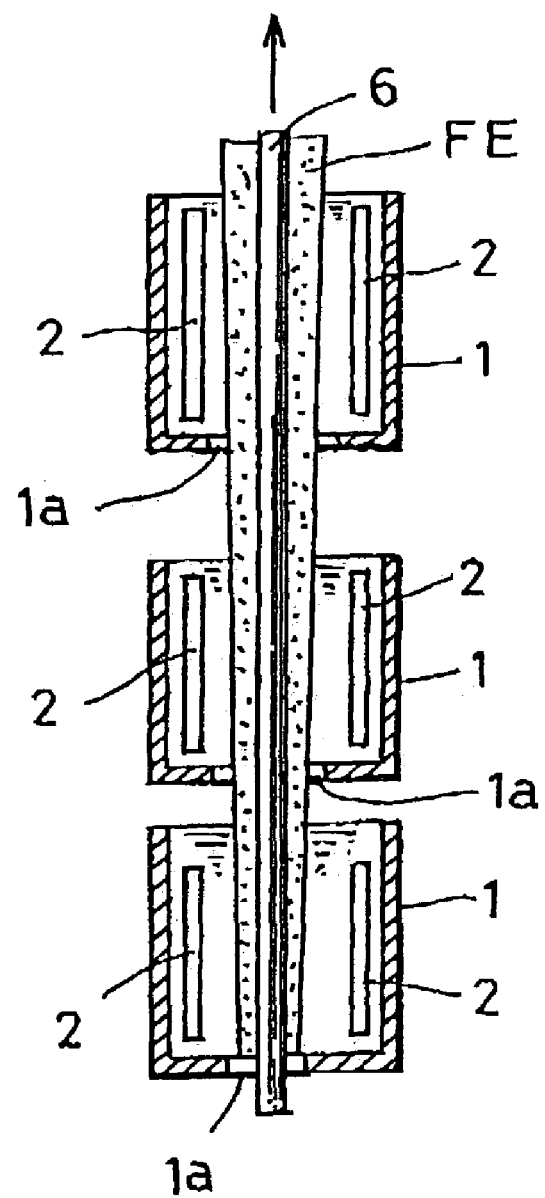
FIG. 10 is a schematic vertical-section side view of the principal parts of the multitiered structure of the electroforming cistern of the present invention.

Further, in the above-mentioned embodiments of the present invention, the constitution of the electroforming cistern is merely in combination with the receiving cistern 12. But, as shown in FIG. 10, a vertically multitiered type cistern can also be used. In this case, the space between the hole 1a that extends through the internal-diameter-formation member and the electroformed layer FE conveys the flow of the electroforming liquid from the upper cistern to the lower cistern. Also, it is recommended for the overflow to proceed from the upper tier to the lower tier as in the first embodiment (by said overflow the electroforming liquid is brought to the storing cistern 11 in the lowest tier (not shown)). Hereby, the problem of vertical variation of the water pressure is solved, and both the exchange of anodes and maintenance work are more easily accomplished. Further, by measuring the diameter of the growing electroformed layer FE between the cisterns, the growth condition of the electroformed layer can be observed in the electroforming process.

Figure 11:
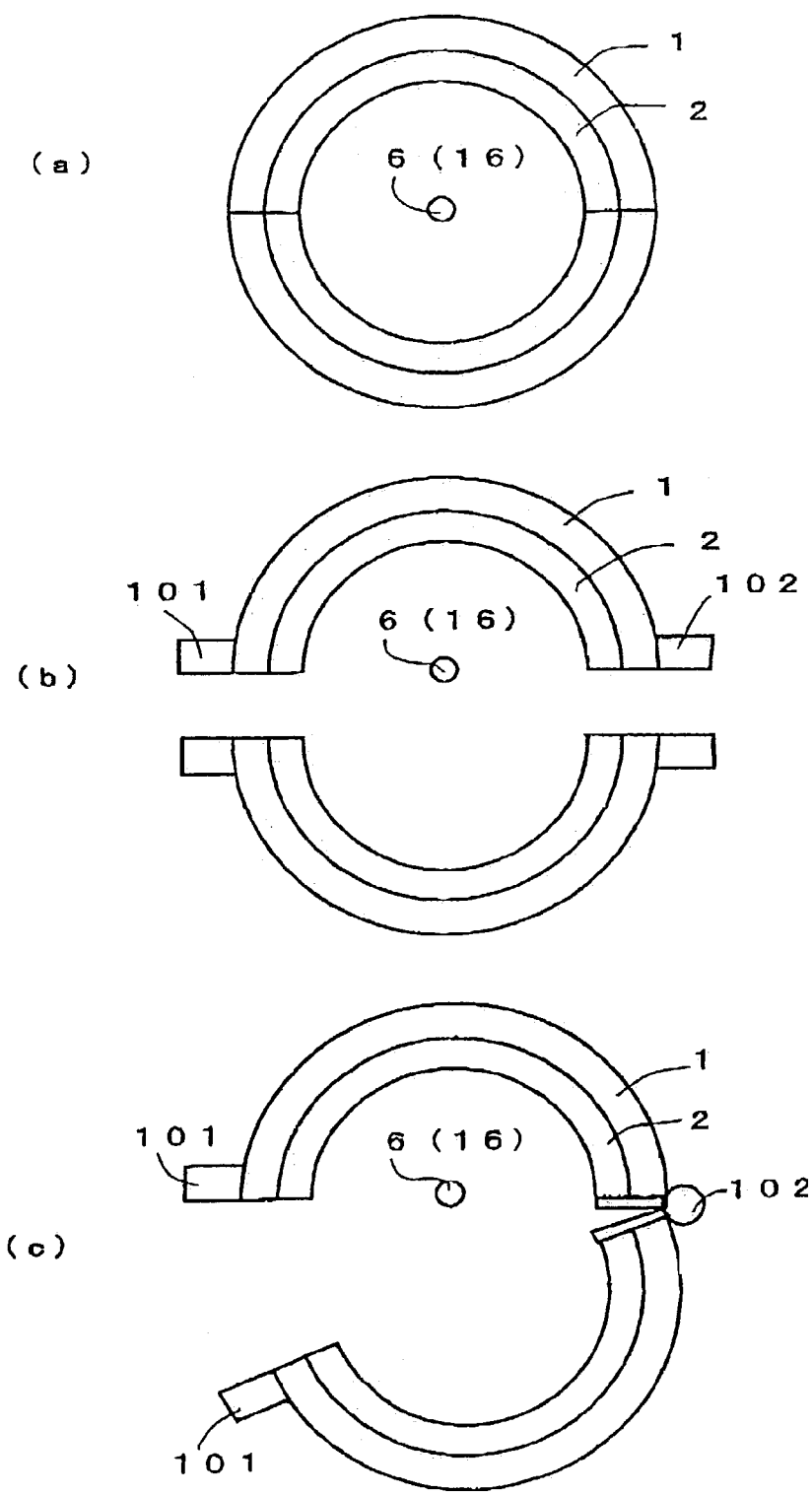
FIG. 11 is a transverse cross-sectional view of the principal parts of the multitiered structure of the same electroforming cistern of the present invention.

Further, in this embodiment, as shown in traverse section (a) of FIG. 11, the multitiered electroforming cistern is composed of semi-cylindrical bodies that are connected by screws in the flange 101 formed therein (see (b) of FIG. 11) or are open sideways by the hinge 102 furnished on one side thereof. In this case, the anode 2 is desirably constituted to be in semi-cylindrical-shape contact with the internal wall of the electroforming cistern 1 (see (c) of FIG. 11).

Also, in the early stage of the present invention's method of electroforming, bubbles arising in the electroforming liquid should be removed because such removal prevents the arising of hollows in the accumulated tube-shaped electroformed layer. In particular, for removing bubbles on the exposed surface of the cathode core member (the dummy 16, the internal-diameter-formation member 6, or the cylindrical member 6) so as to improve the wetness, for example, the following process can be used while controlling the liquid's temperature.

(1) Move the cathode core member in and out of the solution several times.

(2) Release a comparatively large bubble from the lower side of the cathode core member.

(3) Oscillate the cathode core member in the solution.

(4) Rotate the cathode core member at a high velocity.

Herein, because the dummy 16 as a cathode core member or the internal-diameter-formation member (cylindrical member) 6 determines the internal diameter of the metal ferrule, that is to say, the hole diameter of the hole through which optical fiber strand is inserted, high accuracy is needed to ensure the uniformity of the thickness, circularity (approximation degree between the intended diameter and the obtained diameter in the cathode core member), and linearity of the ferrule F.

Also, in the present invention, in order to keep the concentricity and circularity of the internal and external diameters of the electroformed layer FE within the prescribed limits, when the dummy 16 as the cathode core member or the internal-diameter-formation member (cylindrical member) 6 is rotated, it is possible to adjust the velocity of rotation or to change the current value to be applied in electrolysis, if necessary.

Further, if the diameter of the electroformed layer is not sufficient when the electroformed layer is lifted, based on the value measured by the measurer, it is recommended to decrease the lifting velocity so as to prolong the time that the electroformed layer remains in the electroforming liquid. Also, as shown in FIG. 1, in any of the embodiments, in order to maintain a constant taper (related to accumulation velocity) in the longitudinal direction of the electroformed layer in the electroforming liquid, it is essential to place the electroformed layer and anode are parallel to each other.

The metal ferrules that are produced according to the present invention that is constituted in this way, can be very advantageously utilized as parts for connecting the terminals of optical fibers, either temporarily or permanently, for a variety of uses in optical devices. Also, when necessary, the metal ferrules produced according to the present invention, which enables the external diameter thereof to be as small as possible and smaller than a conversion ferrule, can enhance the package density of optical fibers as a multi-core ferrule (ferrule) in a variety of connectors, including jack-type connectors, adapters, or receptacles. In the same way, the extremely small eccentricity of said metal ferrules enables optical fibers to be connected more accurately, reducing the loss of optical signals accompanied by the connection.

Also, the length of the metal ferrules (ferrules) is appropriately selected and set in accordance with the connector structure or the like. Further, in the metal ferrules of the present connection, according to the use thereof, such portions as one end face or both end faces of the metal ferrules are desirably processed, for example, to be flat-shaped, or for the purpose of easier insertion of optical fibers therein, to be a back-taper face with an appropriate angle.

What is claimed is:

1. A device for manufacturing metal ferrules used for optical fibers, comprising:
    a means of lifting for lifting a tube-shaped electroformed layer that is grown in the electroforming cistern,
    a means of measuring for measuring the external diameter of the electroformed layer outside the electroforming cistern in the process of the lifting the electroformed layer, and
    a controller for controlling the lifting velocity of the lifter using measurement value of the external diameter as a predicted measurement value, and such that in the electroforming cistern is grown the tube-shaped electroformed layer that has an internal hole which having diameter is the same as the internal diameter of the metal ferrule to be manufactured in the cathode side, opposed to the anode, of the aforementioned electroforming cistern.

2. The device for manufacturing metal ferrules used for optical fibers, according to claim 1, wherein the internal-diameter-formation member whose external diameter is the same as the metal ferrule is furnished in the electroforming cistern and that by growth-guidance thereof the tube-shaped electroformed layer is formed.

3. The device for manufacturing metal ferrules used for optical fibers, according to claim 1, wherein a means of supplying for supplying upwardly through the bottom portion of the electroforming cistern an internal-diameter-formation member whose external diameter is the same as the internal diameter of the metal ferrule, and that around said internal-diameter-formation member a tube-shaped electroformed layer having a cylindrical internal hole is grown in the electroforming cistern, on the cathode side thereof.

4. The device for manufacturing metal ferrules used for optical fibers, according to claim 1, wherein a means of supplying for supplying upwardly through the bottom portion of the electroforming cistern, as a cathode core member whose internal diameter is the same as the internal diameter of the metal ferrule, and that in the electroforming cistern, on the cathode side thereof, and around said internal-diameter-formation member, there is grown a tube-shaped electroformed layer having a cylindrical internal hole.

5. The device for manufacturing metal ferrules used for optical fibers, according to claim 1, wherein the process of lifting from the electroforming cistern is furnished a means of cutting for cutting, outside the electroforming cistern and in the necessary dimensions, the tube-shaped electroformed layer that has been grown to a necessary external diameters.

6. The device for manufacturing metal ferrules used for optical fibers, according to claim 1, wherein a spacer with an intended pitch is furnished in the internal-diameter-formation member that is lifted together with the grown tube-shaped electroformed layer, and such that the necessary faces of upper and lower terminals of the metal ferrules to be manufactured are formed at the upper and lower ends of such spacer, and such that, in the lifting of the internal-diameter-formation member, there is provided a means of removing for removing from the internal-diameter-formation member the tube-shaped electroformed layer that is formed between the spacers.

7. The device for manufacturing metal ferrules used for optical fibers, according to claim 1, wherein the anode opposed to the electroformed layer is placed so that circularity and concentricity of the electroformed layer.

8. The device for manufacturing metal ferrules used for optical fibers, according to claim 1, wherein there is furnished in the process of the lifting a means of rotating for rotating at a specified velocity the tube-shaped electroformed layer that is grown by electroforming, so as to secure a uniform thickness in the circumferential direction thereof so as to improve the circularity and concentricity of the electroformed layer.

9. The device for manufacturing metal ferrules used for optical fibers, according to claim 1, wherein an insoluble anode such as platinum, gold, or titanium is used for the anode.

10. The device for manufacturing metal ferrules used for optical fibers, with said device, as set forth in claim 1, wherein the electroforming cistern is constituted so as to be a vertically multitiered-division type so as both to permit the electroforming liquid to flow down and to allow the overflowing electroforming liquid to flow down to the lowest tier for storage.

* * * * *